United States Patent
Duan et al.

(10) Patent No.: US 7,552,512 B2
(45) Date of Patent: *Jun. 30, 2009

(54) HINGE ASSEMBLY FOR A FOLDABLE ELECTRONIC DEVICE

(75) Inventors: Chao Duan, Shenzhen (CN); Chia-Hua Chen, Tu-Cheng (TW)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 522 days.

This patent is subject to a terminal disclaimer.

(21) Appl. No.: 11/392,032

(22) Filed: Mar. 28, 2006

(65) Prior Publication Data
US 2007/0036350 A1    Feb. 15, 2007

(30) Foreign Application Priority Data
May 20, 2005   (CN) .......................... 2005 1 0034755

(51) Int. Cl.
*E05D 11/10* (2006.01)
(52) U.S. Cl. ............... 16/330; 16/303; 16/275
(58) Field of Classification Search ............. 16/330, 16/303, 275, 276, 273; 379/433.13, 433.12; 361/680–683; 455/90.3, 90.1, 550.1, 575.1, 455/575.3
See application file for complete search history.

(56) References Cited

U.S. PATENT DOCUMENTS

| | | | | |
|---|---|---|---|---|
| 3,499,183 A | * | 3/1970 | Parsons | 16/273 |
| 3,874,028 A | * | 4/1975 | Ernst et al. | 16/276 |
| 3,955,241 A | * | 5/1976 | Little | 16/298 |
| 4,359,804 A | * | 11/1982 | McNinch | 16/276 |
| 5,682,644 A | * | 11/1997 | Bohacik et al. | 16/284 |
| 6,065,187 A | * | 5/2000 | Mischenko | 16/341 |
| 6,920,668 B2 | * | 7/2005 | Hayashi | 16/303 |
| 6,950,686 B2 | * | 9/2005 | Won | 455/575.3 |
| 7,100,244 B2 | * | 9/2006 | Qin et al. | 16/330 |

* cited by examiner

*Primary Examiner*—Chuck Y. Mah
(74) *Attorney, Agent, or Firm*—Steven M. Reiss

(57) ABSTRACT

A hinge assembly (100) includes a shaft (10), a follower (12), a cam (20), a friction-reducing mechanism (30), and an urging means. The shaft includes a securing portion (11) formed thereon. The follower is connected with the shaft. The cam essentially is in the shape of a cylinder, and includes a cam surface (24) and defines a cam hole (22) extending therethrough. The cam hole receives the shaft therethrough. The friction-reducing mechanism is located around the shaft, and includes a rolling means. A first end of the urging means abuts against the shaft, and an opposite second end of the urging means biases the friction-reducing mechanism. The friction-reducing mechanism is disposed between the cam and the urging means. The cam surface of the cam is rotatably and movably engaged with the follower under force of the urging means.

19 Claims, 7 Drawing Sheets

HINGE ASSEMBLY FOR A FOLDABLE ELECTRONIC DEVICE

BACKGROUND OF THE INVENTION

1. Field of the Invention

The present invention relates to hinge assemblies and, particularly, to a hinge assembly for foldable electronic devices, such as mobile telephones, electronic notebooks, and so on.

2. Discussion of the Related Art

With the development of wireless communication and information processing technologies, portable electronic devices such as mobile telephones and electronic notebooks are now in widespread use. These electronic devices enable consumers to enjoy the convenience of high technology services anytime and anywhere. Consumers particularly favor foldable electronic devices for their convenience.

Generally, foldable electronic devices have most of the electronics in one housing, called the body. The other housing, called the cover, normally contains fewer electronic components than the body. Other foldable electronic devices have all the electronics in the body, with the cover containing no electronics. Various types of hinge assemblies are used to join a body and a cover of a foldable electronic device, so that the cover can unfold up from and fold down upon the body. Manufacturers are constantly seeking to reduce the volume, size and/or weight of portable foldable electronic devices. Thus, it is desirable that the hinge assembly coupling the main housing with the cover is modularized and miniaturized. Modularized hinge assemblies usually consist of moving parts such as a cam member, a cam follower, a shaft, and a spring, held together in a unified structure. Where either the cam member or the cam follower directly contacts the spring. The structure is easily and quickly attached to the main housing and the cover during mass production. The cam member and the cam follower always contact each other under the force of the spring.

One kind of the hinge assembly includes a housing secured to a body of the mobile phone, a spring received in the housing, a rotary cam rod, and a shaft with a follower and a connecting portion. The rotary cam rod is received in the housing and engages with the housing. One end of the spring contacts an inner wall of the housing, and the other end of the spring resists one end of the rotary cam rod. The shaft passes through the rotary cam rod, the spring and a washer in that order.

Although the above-described hinge assembly is suitable for some foldable electronic devices, sliding friction is produced between the spring and the rotary cam rod because of relative rotation therebetween. This wastes energy and causes abrasion of the spring and the rotary cam rod. The abrasion may eventually lead to premature malfunction or failure of the hinge assembly.

What is needed, therefore, is a hinge assembly which has a relatively simple and small modularized configuration, which can be produced at low cost, and which has a relatively low amount of friction associated therewith.

SUMMARY OF THE INVENTION

A hinge assembly is exemplified to join a flip cover to a main body of a foldable electronic device. The hinge assembly includes a solid shaft, a follower, a cam, a friction-reducing mechanism, a retaining member, and an urging (i.e. driving) member. The shaft includes a securing portion and a flange portion formed thereon. The follower is integrally connected with the shaft. The cam includes a cam surface defining a cam hole extending therethrough, the cam hole receiving the shaft therethrough. The friction-reducing mechanism is located around the shaft, and includes a rolling member. A first end of the urging member abuts the retaining member, and an opposite second end of the urging member biases the friction-reducing mechanism. The friction-reducing mechanism is disposed between the cam and the urging member. The cam surface of the cam is rotatably engaged with the follower under the driving force of the urging member.

Other advantages and novel features will become more apparent from the following detailed description when taken in conjunction with the accompanying drawings.

BRIEF DESCRIPTION OF THE DRAWINGS

Many aspects of the hinge assembly can be better understood with reference to the following drawings. The components in the drawings are not necessarily drawn to scale, the emphasis instead being placed upon clearly illustrating the principles of the present hinge assembly. Moreover, in the drawings, like reference numerals designate corresponding parts throughout the several views.

DETAILED DESCRIPTION OF PREFERRED EMBODIMENTS

Figure 1:
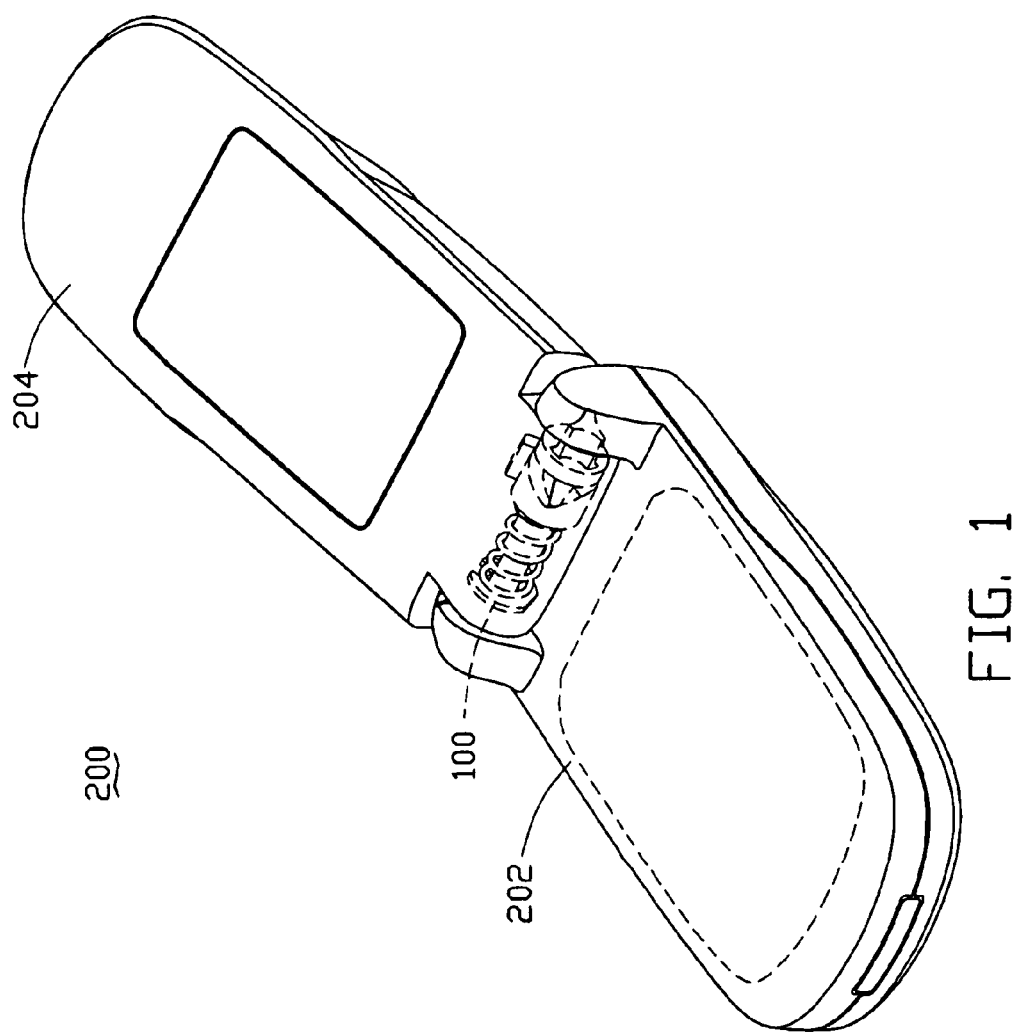
FIG. 1 is a schematic, isometric view of a flip-type mobile phone including a flip cover, a main body, and a hinge assembly according to a first preferred embodiment, the hinge assembly being shown with dashed lines.

Referring now to the drawings, FIG. 1 shows a flip-type mobile phone 200, which includes a hinge assembly 100, according to a preferred embodiment. The mobile phone 200 has a main body 202 and a flip cover 204. The main body 202 and the flip cover 204 are pivotally connected to each other via the hinge assembly 100. It should be noted that the hinge assembly 100 may also, for example, be used to interconnect components like a main body and a flip cover of any of a variety of different foldable devices other than the mobile phone 200.

Figure 2:
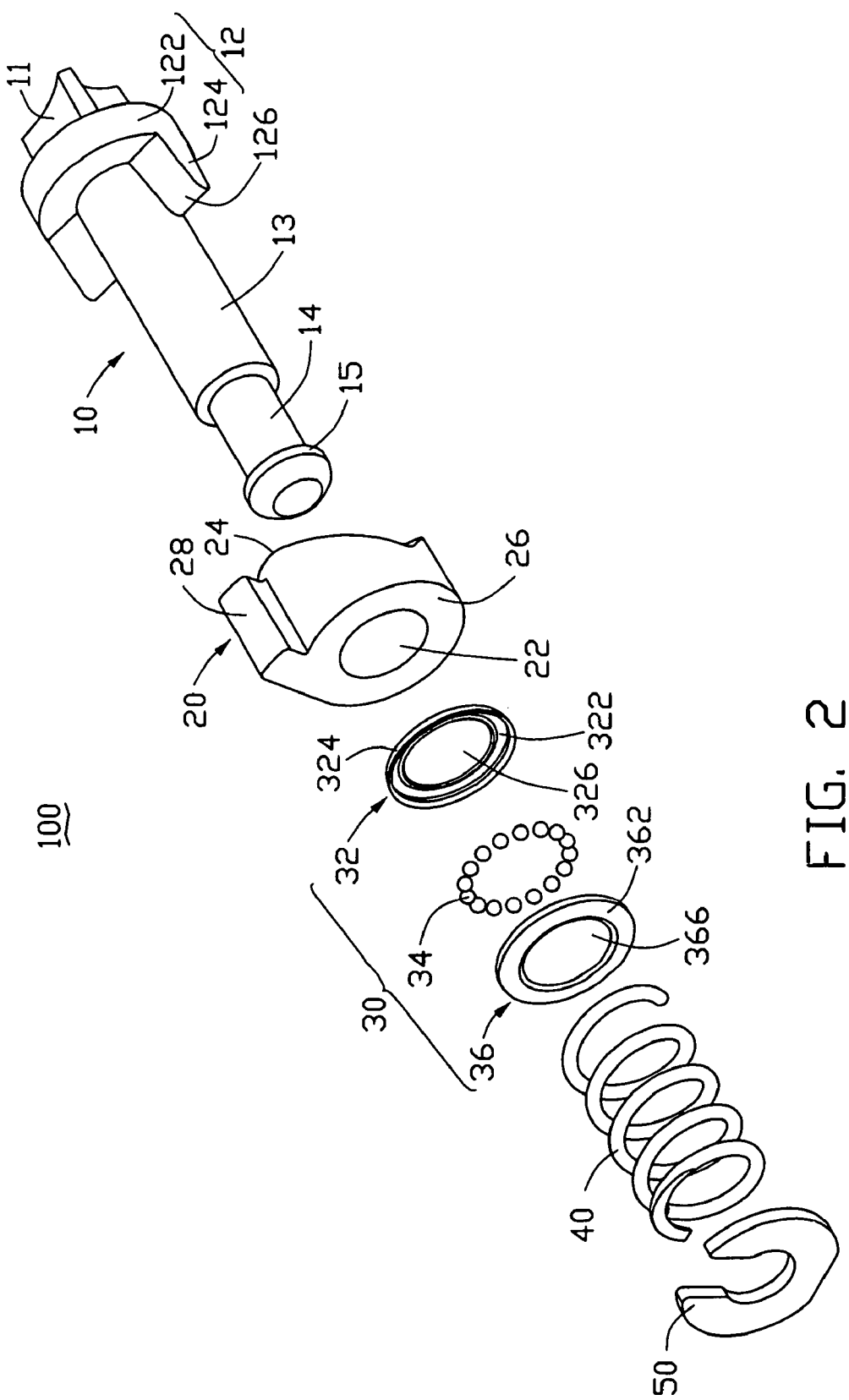
FIG. 2 is an enlarged, assembled view of the hinge assembly of FIG. 1.
Figure 3:
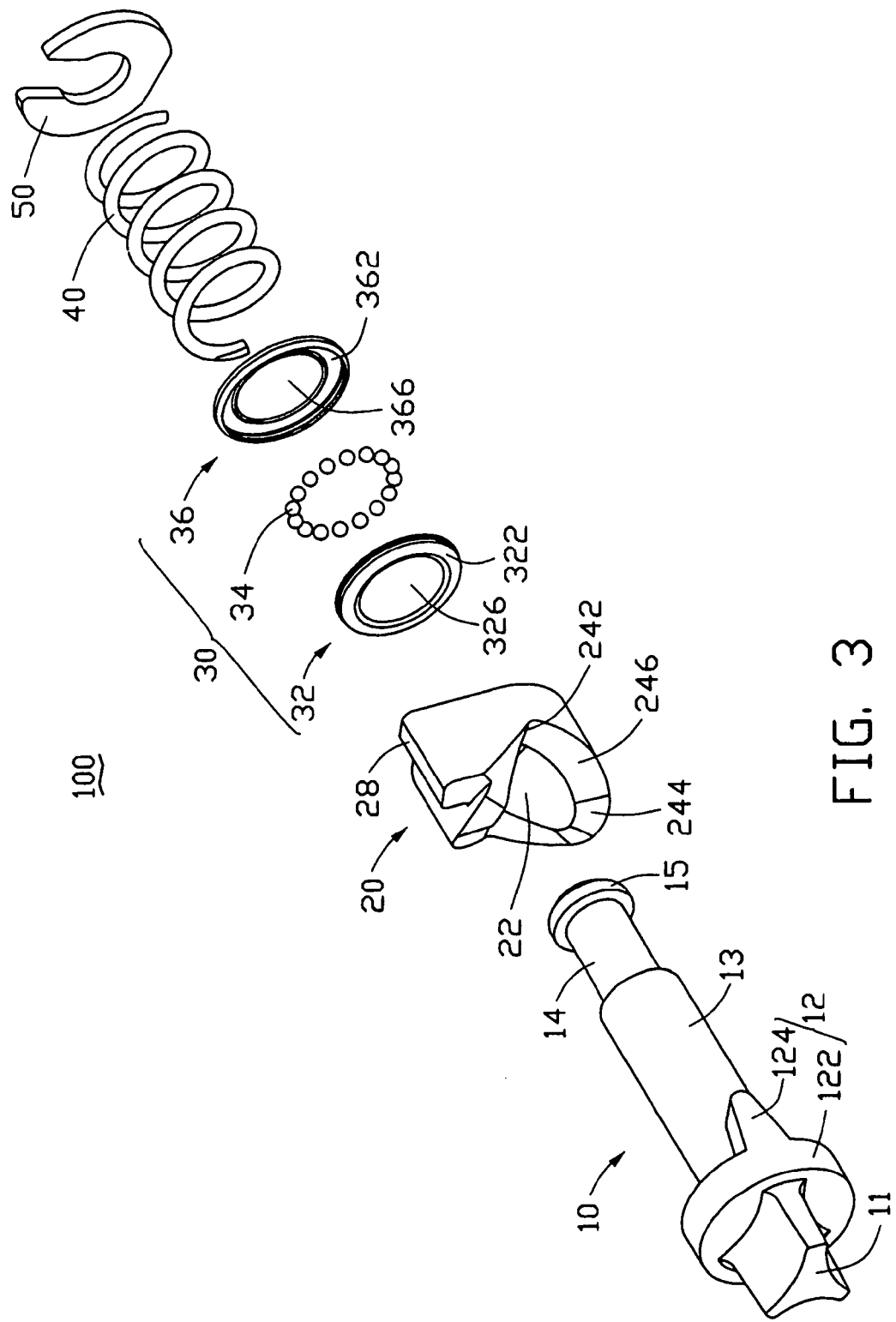
FIG. 3 is similar to FIG. 2, but viewed from another aspect.

Referring now to FIGS. 2-3, the hinge assembly 100 includes a solid shaft 10, a cam 20, a friction-reducing mechanism 30, a spring 40 functioning as an elastic urging member, and a C-clip 50 functioning as a retaining member. The friction-reducing mechanism 30 includes a first baffle plate 32, a plurality of ball bearing 34 and a second baffle plate 36. The shaft 10 extends through the cam 10, the friction-reducing mechanism 30, the spring 40 and the C-clip 50, thereby integrating the binge assembly 100 into a complete unit.

The solid shaft 10 includes in sequence a securing portion 11 formed at one end thereof, an integrally connected follower 12 adjacent the securing portion 11, a solid shaft portion 13, a solid neck portion 14, and a flange portion 15 opposite to the securing portion 11. The solid neck portion 14 connects the shaft portion 13 and the flange portion 15. The securing portion 11 is for engaging with the main body 202 of the mobile phone 200. The follower 12 includes an enlarged cylindrical portion 122, and two symmetrically opposite finger portions 124 as a cam surface extending in an axial direction and adjoining one end of the shaft portion 13. Each finger portion 124 has a top portion 126.

The cam 20 is a generally cylindrical body and defines a central cam hole 22 extending therethrough. The cam 20 has a cam surface 24 formed at one end thereof, and a planar end surface 26 on an opposite end thereof. The cam surface 24 includes two valleys 242, two peaks 244, four inclined planes 246 disposed between the valleys 242 and the peaks 244. Preferably, the valleys 242 are located 180 degrees apart from each other, with the peaks 244 are located 180 degrees from each other. The cam 20 has a protrusion 28 formed on outer peripheral wall thereof, the protrusion 28 being oriented parallel to the central axis of the cam 20. The protrusion 28 is for engaging with the flip cover 204 of the mobile phone 200.

Figure 4:
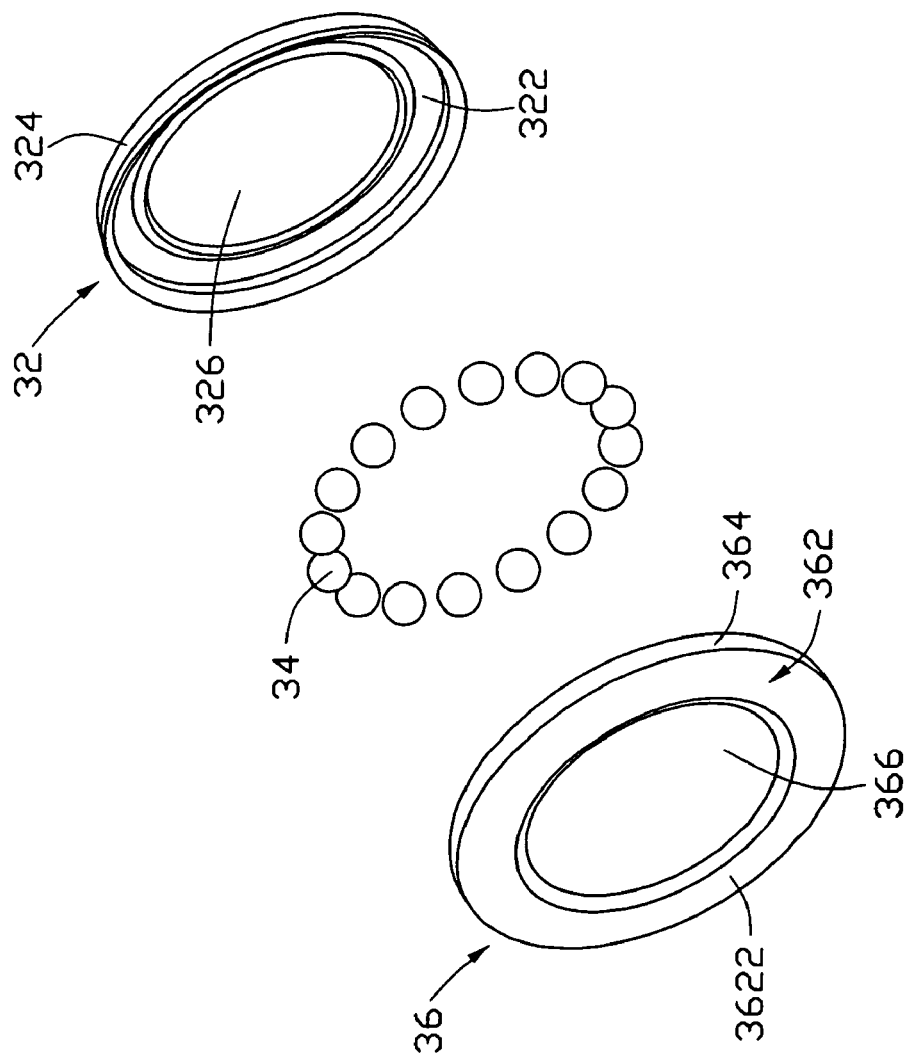
FIG. 4 is an exploded, isometric view of a friction-reducing mechanism of the hinge assembly of FIG. 2.
Figure 5:
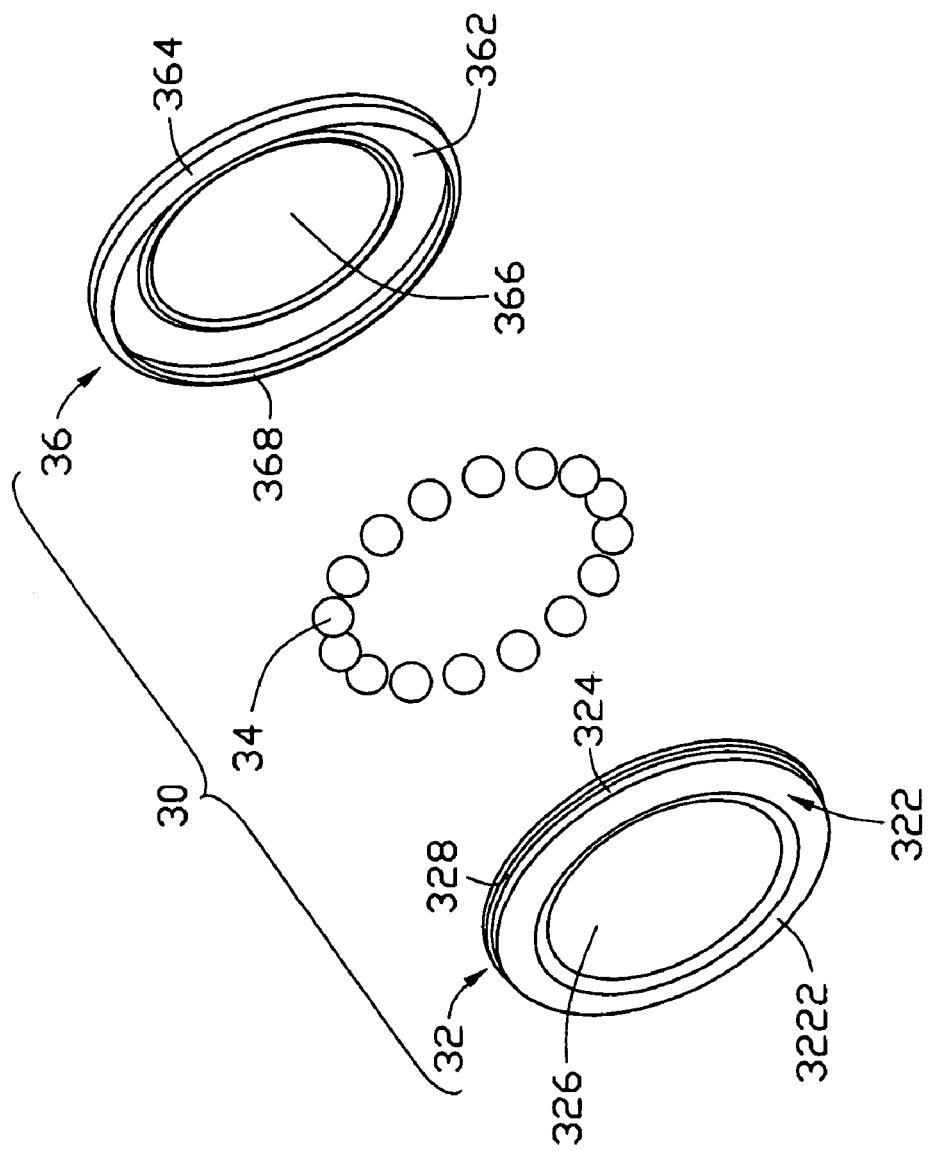
FIG. 5 is similar to FIG. 4, but viewed from another aspect.
Figure 6:
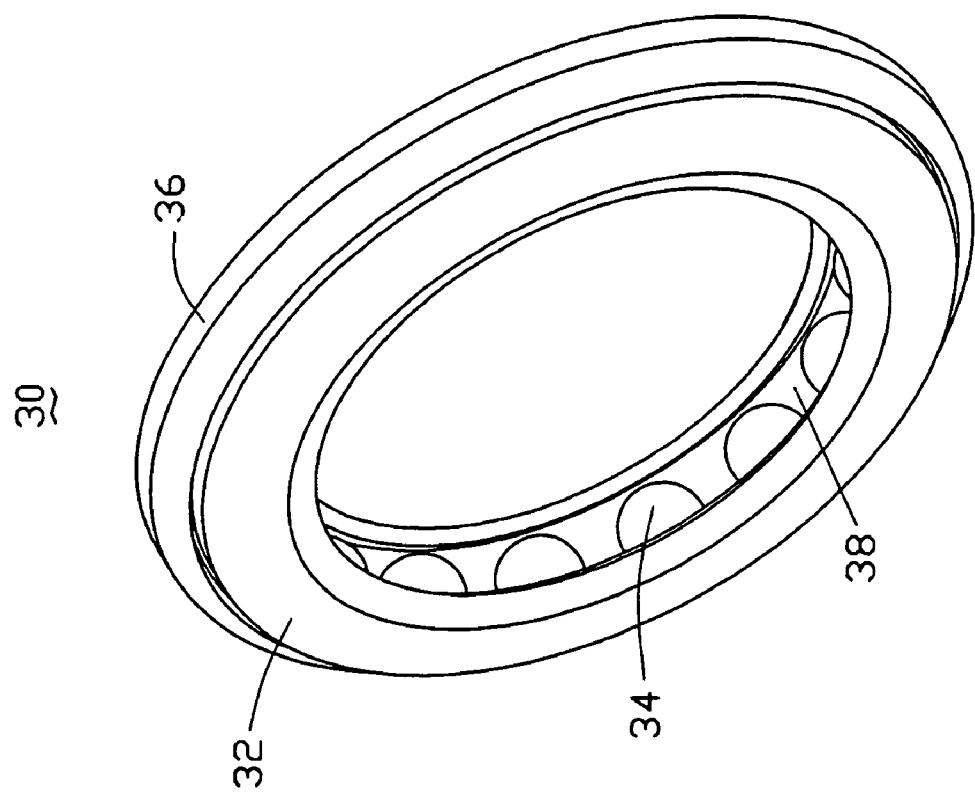
FIG. 6 an assembled view of friction-reducing mechanism the of FIG. 4.

Referring to FIGS. 4-6, the first baffle plate 32 is circular ring-shaped. The first baffle plate 32 includes a first bottom portion 322, and a first bent portion 324 formed by bending the outer periphery of the first bottom portion 322 to a one side of the first bottom portion 322. The first bottom portion 322 has a central opening 326 extending therethrough. The first bent portion 324 has a latching protrusion 328 formed on outer periphery thereof. The first bottom portion 322 has an outer surface 3222 abutting the planar end surface 26 of the cam 20.

The plurality of ball bearings 34 cooperatively forms a ring member.

The second baffle plate 36 is circular ring-shaped. The second baffle plate 36 includes a second bottom portion 362, and a second bent portion 364 formed by bending the outer periphery of the second bottom portion 362 to a one side of the second bottom portion 362. The second bottom portion 362 has a central opening 366 extending therethrough. The second bent portion 364 has a latching groove 368. The latching groove 368 corresponds to the latching protrusion 328 of the first baffle plate 32. The second bottom portion 362 has an outer surface 3622 abutting the spring 40.

The spring 40 is helical and preferably metallic, with an inner diameter larger than a diameter of the large diameter portion 13 of the shaft 10. Thus the spring 40 can be located around the shaft 10.

Figure 7:
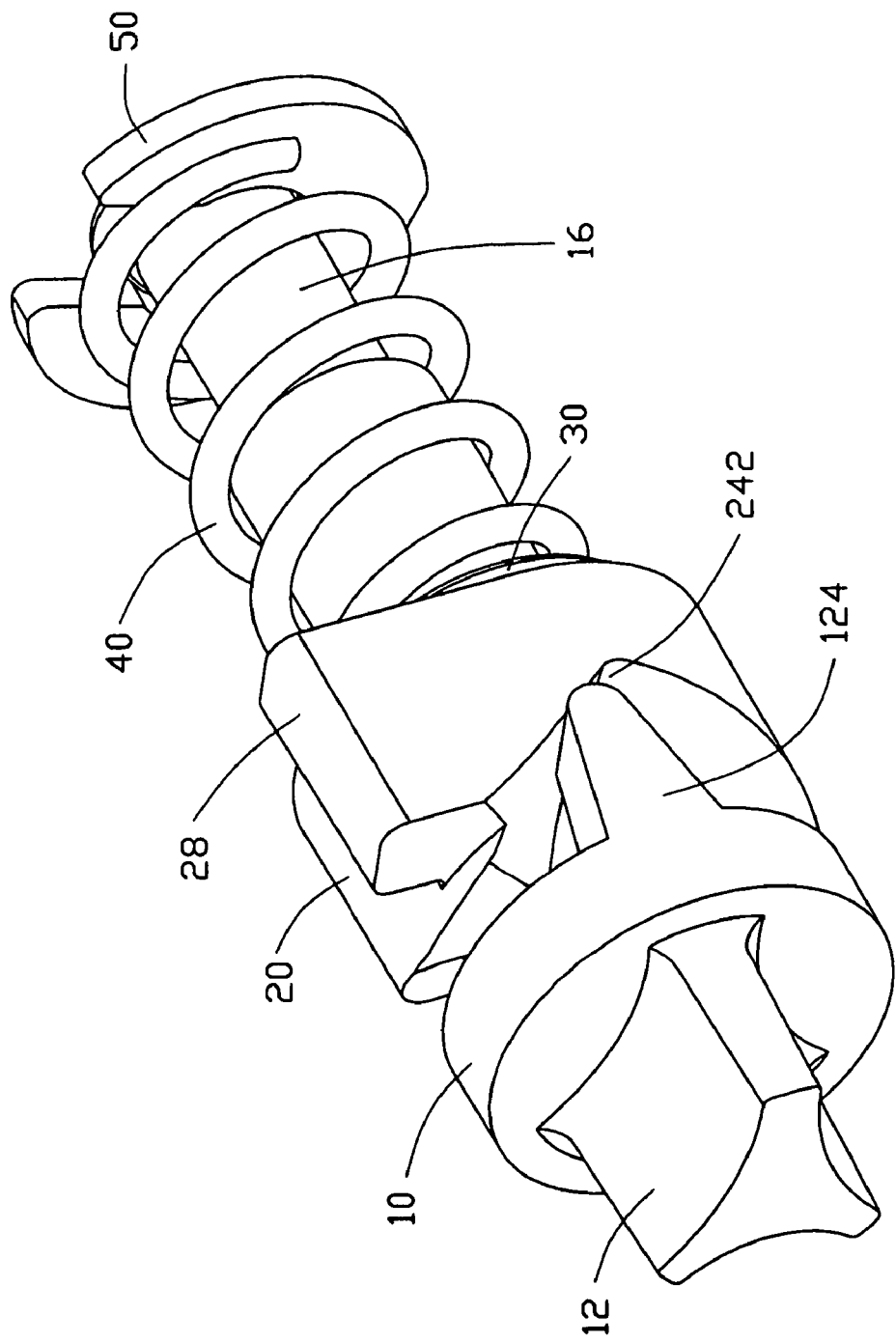
FIG. 7 is an assembled view of the hinge assembly of FIG. 2.

In the assembly of the hinge assembly 100, referring to FIG. 7, firstly, the ball bearings 34 are placed in the first baffle plate 32. The second baffle plate 36 is adjoined with the first baffle plate 32 together to define a receiving cavity 38, with the latching protrusion 328 of the first baffle plate 32 engaging in the latching groove 368 of the second baffle plate 36. The ball bearings 34 are received in the receiving cavity 38. Then, the shaft 10 passes through the cam hole 22 of the cam 20, the central openings 326, 366 of the first baffle plate 32 and the second baffle plate 36, the spring 40 and the C-clip 50. A first end of the spring 40 resists the second bottom portion 362 of the baffle plate 36, an opposite second end of the spring 40 resists the C-clip 50. Because of the urging force of the spring 40 the cam surface 24 of the cam 20 will contact the finger portions 124 no matter what rotational position the cam 20 is in.. The hinge assembly 100 is thus completely assembled, as shown in FIG. 7.

Referring to FIGS. 1 and 7, in use, the protrusion 28 of the cam 20 is engaged (i.e., operatively located/fixed) in a cavity (not shown) of the flip cover 204 of the mobile phone 200, and cannot rotate relative to the flip cover 204. The securing portion 11 of the shaft 10 is engaged in the main body 202 of the mobile phone 200, and cannot rotate relative to the main body 202. When the flip cover 204 of the mobile phone 200 is in a fully closed position or a fully open position, the finger portions 124 of the shaft 10 are located in the valleys 242 of the cam 20 and engage with the valleys 242.

When the flip cover 204 of the mobile phone 200 is rotated between an open position and a closed position (or vice versa), the cam 20 rotates along with the flip cover 204, while the shaft 10 remains fixed in the main body 202 of the mobile phone 200. As a result, the finger portions 124 ride along the inclined planes 246 of the cam surface 24 from the valleys 242 to the peaks 244 (see FIG. 4). Simultaneously, the cam 20 moves axially and resists the first baffle plate 32, which makes the first baffle plate 32 rotate relative to the second baffle plate 36, and compresses the spring 40. Also, the ball bearings 34 rotate and roll relative to the first baffle plate 32. Because the first baffle plate 32 and the second baffle plate 36 resist each other via the ball bearings 34, only rolling friction is produced between the first baffle plate 32 and the second baffle plate 36. Once the finger portions 124 pass over the peaks 244, the spring 40 decompresses and drives the cam 20 back toward the cylindrical portion 122, with the finger portions 124 riding along the inclined planes 246 from the peaks 244 to the valleys 242. The flip cover 204 is thus rotated automatically to the fully closed position (or fully open position) under the decompression force of the spring 40. Accordingly, the flip cover 204 is moved 180 degrees relative to the main body 202, with the finger portions 124 once again mating in the valleys 242. In this way, the flip cover 202 is closed (or opened). Preferably, the structures of the flip cover 204 and the main body 202 are adapted to control the degree of rotation of the hinge assembly 10, such that the finger portions 124 can be held in one or more particular locations between the valleys 242 and the peaks 244.

A main advantage of the hinge assembly 100 is that the cam 20 and the spring 40 do not directly contact each other, thereby reducing friction associated with relative rotation between the cam 20 and the spring 40 via the friction-reducing mechanism 30. Accordingly, when the hinge assembly 100 is assembled in the mobile phone 200, the energy required in opening the flip cover 202 of the mobile phone 200 is reduced. Furthermore, wear of the cam 20 and the spring 40 is reduced, and the working lifetime of the hinge assembly 100 is prolonged.

In further alternative embodiments, the follower 12 can be a separate element that is not integrally formed with the shaft 10. In such case, the follower 12 defines a shaft hole, and has a cam surface or finger portions. The ball bearings 34 can be replaced by another kind of rolling member such as roller bearings. The spring 40 can be made of a nonmetallic material such as plastic. Furthermore, the spring 40 can instead be another kind of elastic element or urging member known in the art, such as a resilient cylinder. The C-clip 50 can be omitted, in which case the spring 40 directly resists the flange portion 15, and there can 20 be more than one protrusion 28.

However, when the securing portion 11 of the shaft 10 is used to connect with the flip cover 204, and the protrusion 28 of the cam 20 is used to connect with the main body 202. In such case, there is no relative rotation between the cam 20 and the spring 40, whereas there is relative rotation between the C-clip 50 and the spring 40. Accordingly, the friction-reducing mechanism 30 is disposed between the spring 40 and the C-clip 50. Because the C-clip 50 and the spring 40 resist each other via the friction-reducing mechanism 30, only rolling friction is produced between C-clip 50 and the spring 40. In an alternative embodiment, the C-clip 50 can be omitted. In such case, the friction-reducing mechanism 30 is disposed between the spring 40 and the flange portion 15 of the shaft 10.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A hinge assembly for joining a flip cover to a main body of a foldable electronic device, comprising:
    a shaft comprising a securing portion and a flange portion opposite to the securing portion;
    a follower integrally connecting with the shaft;
    a cam comprising a cam surface and defining a cam hole extending therethrough, the cam hole receiving the shaft therethrough;
    a friction-reducing mechanism located around the shaft, and including a rolling member;
    a retaining member configured to secure around the shaft and abut the flange portion; and
    an urging member, a first end of the urging member abutting against the retaining member, an opposite second end of the urging member biasing the friction-reducing mechanism, the friction-reducing mechanism being disposed between the cam and the urging member, and configured for reducing friction between the cam and the urging member, the cam surface of the cam being rotatably engaged with the follower under force of the urging member.

2. The binge assembly as claimed in claim 1, wherein the shaft is solid and further comprises a solid shaft portion and a solid neck portion, the securing portion, the shaft portion, the neck portion, and the flange portion arranged from one end of the shaft to the other opposite end of the shaft in sequence, the neck portion connecting the flange portion and the shaft portion.

3. The hinge assembly as claimed in claim 2, wherein the friction-reducing mechanism further comprises a first baffle plate, and a second baffle plate, the first baffle plate abuts the cam, the second baffle plate abuts the urging member, the rolling member is a plurality of ball bearings movably received in a cavity defined between the first baffle plate and the second baffle plate, and the first baffle plate movably engages with the second baffle plate.

4. The hinge assembly as claimed in claim 3, wherein the first baffle plate includes a first bottom portion and a first bent portion formed on an outer periphery of the first bottom portion, the second baffle plate includes a second bottom portion and a second bent portion formed on an outer periphery of the second bottom portion, and the first bent portion movably engages with the second bent portion.

5. The hinge assembly as claimed in claim 4, wherein the second bent portion has a latching groove defined in an outer periphery thereof, the first bent portion forms a latching protrusion on an outer periphery thereof, and the latching protrusion movably engages in the latching groove.

6. The hinge assembly as claimed in claim 1, wherein the follower and the shaft are integrally formed, the follower is adjacent the securing portion and comprises two finger portions, and the cam surface of the cam is rotatably engaged with the finger portions.

7. The hinge assembly as claimed in claim 1, wherein the retaining member is a C-clip, the first end of the urging member abutting the C-clip.

8. The hinge assembly as claimed in claim 1, wherein the urging member is a helical spring located around the shaft.

9. The hinge assembly as claimed in claim 1, wherein the cam surface has a pair of opposite valleys and a pair of opposite peaks.

10. The hinge assembly as claimed in claim 1, wherein the securing portion is formed at one end of the shaft, the flange portion is formed at an opposite end of the shaft.

11. A hinge assembly for joining a cover to a main body of foldable electronic device, comprising:
    a shaft having a securing portion configured so as to be fixed relative to one of the main body and the cover;
    a follower integrally connecting with the shaft, the follower having a first cam surface;
    a cam configured so as to be fixed relative to the other of the main body and the cover, the cam having a second cam surface facing the first cam surface, and having a cam hole defined therethrough, the cam hole receiving the shaft therethrough;
    an urging member biasing the cam against the follower so that the first and second cam surface are engaged; and
    a friction-reducing mechanism engagingly sandwiched between the urging member and the cam, and configured for reducing friction between the cam and the urging member.

12. The hinge assembly as claimed in claim 11, wherein the friction-reducing mechanism further comprises a first baffle plate, and a second baffle plate, the rolling member is a plurality of ball bearings movably received in a cavity defined between the first baffle plate and the second baffle plate, the first baffle plate abuts the cam, and the second baffle plate abuts the urging member.

13. The hinge assembly as claimed in claim 12, wherein the first baffle plate movably engages with the second baffle plate.

14. The hinge assembly as claimed in claim 13, wherein the first baffle plate includes a first bottom portion and a first bent portion formed on an outer periphery of the first bottom portion, the second baffle plate includes a second bottom portion and a second bent portion formed on an outer periphery of the second bottom portion, and the first bent portion movably engages with the second bent portion.

15. The binge assembly as claimed in claim 14, wherein the second bent portion has a latching groove defined in an outer periphery thereof, the first bent portion forms a latching protrusion on an outer periphery thereof, and the latching protrusion movably engages in the latching groove.

16. The hinge assembly as claimed in claim 11, wherein the follower and the shaft are integrally formed, the first cam surface comprises two opposite finger portions, and the second cam surface of the cam is rotatably engaged with the finger portions.

17. A foldable electronic device, comprising:
    a main body;
    a flip cover; and
    a hinge assembly joining the flip cover to the main body, the hinge assembly comprising:
        a shaft comprising a securing portion and a flange portion opposite to the securing portion;
        a follower integrally connecting with the shaft;
        a cam comprising a cam surface and defining a cam hole extending therethrough, the cam hole receiving the shaft therethrough;
        a friction-reducing mechanism located around the shaft, and including a rolling member;
        a retaining member configured to secure around the solid shaft and abut the flange portion; and an urging member, a first end of the urging member abutting against the retaining member, an opposite second end of the urging member biasing the friction-reducing mechanism, the friction-reducing mechanism being disposed between the cam and the urging member and configured for reducing friction between the cam and the urging member, the cam surface of the cam being rotatably engaged with the follower under force of the urging member.

18. The foldable electronic device as claimed in claim 17, wherein the solid shaft further comprises a solid shaft portion and a solid neck portion, the securing portion, the shaft portion, the neck portion and the flange portion arranged from one end of the shaft to the other opposite end of the shaft in sequence, the neck portion connecting the flange portion and the shaft portion.

19. The foldable electronic device as claimed in claim 17, wherein the friction-reducing mechanism further comprises a first baffle plate, and a second baffle plate, the rolling member is a plurality of ball bearings movably received in a cavity defined between the first baffle plate and the second baffle plate, the first baffle plate movably engages with the second baffle plate, the first baffle plate abuts the cam, and the second baffle plate abuts the urging member.

* * * * *